United States Patent
Kawasaki (10) Patent No.: US 6,932,432 B2
(45) Date of Patent: Aug. 23, 2005

(54) SEAT STRUCTURE

(75) Inventor: Seiji Kawasaki, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/684,490

(22) Filed: Oct. 15, 2003

(65) Prior Publication Data

US 2004/0130202 A1 Jul. 8, 2004

(30) Foreign Application Priority Data

Oct. 17, 2002 (JP) .................................. 2002-302703

(51) Int. Cl.⁷ ................................................ A47C 7/02
(52) U.S. Cl. ............................ 297/452.56; 297/452.48
(58) Field of Search ....................... 297/452.56, 452.48

(56) References Cited

U.S. PATENT DOCUMENTS

| | | | | |
|---|---|---|---|---|
| 4,834,458 A | * | 5/1989 | Izumida et al. | 297/452.23 |
| 5,013,089 A | * | 5/1991 | Abu-Isa et al. | 297/452.64 |
| 6,152,534 A | * | 11/2000 | Maeda et al. | 297/452.56 |
| 6,231,125 B1 | * | 5/2001 | Maeda et al. | 297/452.56 |
| 6,302,487 B1 | * | 10/2001 | Fujita et al. | 297/452.56 |
| 2002/0060493 A1 | * | 5/2002 | Nishino et al. | 297/452.56 |
| 2002/0096932 A1 | * | 7/2002 | Fujita et al. | 297/452.56 |
| 2003/0193231 A1 | * | 10/2003 | Fujita et al. | 297/452.56 |
| 2004/0130201 A1 | * | 7/2004 | Kawasaki et al. | 297/452.56 |

* cited by examiner

Primary Examiner—Peter M. Cuomo
Assistant Examiner—Sarah C. Burnham
(74) Attorney, Agent, or Firm—Wenderoth, Lind & Ponack, L.L.P.

(57) ABSTRACT

A seat structure includes a seat frame having two side frames and front and rear frames, a planar elastic member stretched between the front and rear frames, a three-dimensional net overlaid on the planar elastic member, two covering materials sewn to opposite side edge portions of the planar elastic member, respectively, and a first cushioning material (14) disposed on each of the two side frames and covered with one of the covering materials. The planar elastic member has upper and lower layers at a location close to the front frame with a predetermined space created between the upper and lower layers.

7 Claims, 8 Drawing Sheets

SEAT STRUCTURE

BACKGROUND OF THE INVENTION

1. Field of the Invention

The present invention relates to a seat structure in which a combination of a two- or three-dimensional net having a large hysteresis loss and metal springs having a small hysteresis loss is employed to enhance the vibration absorptivity and the posture supporting or holding properties.

2. Description of the Related Art

Conventional automobile seats generally include spring members attached to a seat frame, a pad material such as a foam material or cotton placed thereon, and a skin such as a vinyl leather, woven cloth, or leather covered thereon. On the other hand, seats other than automobile seats generally include a pad material placed on the frame and covered with a skin, and some of them also include spring members for enhancing the cushioning characteristics. Although the spring members or the pad material acts to provide desired cushioning characteristics, conventional seats are mostly thick, heavy and costly.

In view of the above, a variety of lightweight, inexpensive and thin seats have recently been proposed, and the inventors of this application have developed thin seats having a lightweight net of a three-dimensional structure that is provided with desired characteristics (spring properties, damping characteristics and the like) sufficient for a cushioning material.

A three-dimensional net (hereinafter referred to as 3-D net) as employed in such thin seats is formed of a three-dimensional knit fabric, which has a ground fabric formed into, for example, a knit texture or a honeycomb-shaped (hexagonal) mesh. The 3-D net has a three-layered solid truss structure in which an upper mesh layer and a lower mesh layer are connected to each other by a pile layer having a large number of piles. Each yarn of the upper mesh layer and the lower mesh layer is formed by twisting a number of fine threads, while each of the piles is formed of a single thick string to provide the three-dimensional knit fabric with rigidity.

However, in the case where the 3-D net is employed in automobile seats, a user sometimes feels a pain or a strong pressure on his or her legs or thighs when getting in or out of the automobile or operating pedals. Even in the case where the 3D net is employed in seats other than the automobile seats, the user sometimes feels a similar pain.

SUMMARY OF THE INVENTION

The present invention has been developed to overcome the above-described disadvantages. It is accordingly an objective of the present invention to provide a seat structure having spring properties at a front portion and side portions of a seat cushion not to make a user feel any pain on his or her legs or thighs when getting in or out of an automobile.

In accomplishing the above and other objectives, the seat structure according to the present invention includes a seat frame having two side frames and front and rear frames, a planar elastic member stretched between the front and rear frames, a three-dimensional net overlaid on the planar elastic member, two covering materials sewn to opposite side edge portions of the planar elastic member, respectively, and a first cushioning material disposed on each of the two side frames and covered with one of the covering materials. The planar elastic member has upper and lower layers at a location close to the front frame with a predetermined space created between the upper and lower layers.

When a user gets in or out of an automobile or operates pedals, the presence of such a space relieves pressure on his or her legs or thighs. Further, because the two covering materials are respectively sewn to the opposite side edge portions of the planar elastic member and the cushioning materials disposed on the side frames are each covered with the covering material, the cushioning materials provide the side portions of the seat cushion with resiliency, making it possible to allow the user to not feel any pain when getting in or out of the automobile.

Advantageously, the seat structure further includes a second cushioning material disposed below the first cushioning material. The second cushioning material acts to increase the resiliency on the side portions of the seat cushion.

Again advantageously, the seat structure further includes a third cushioning material covered on the front frame and interposed between the planar elastic member and the three-dimensional net. The third cushioning material provides the front frame with resiliency, making it possible to relieve a pressure on his or her legs or thighs.

An elastic cloth made up of warps and wefts having different tensile properties may be used for the planar elastic member.

Even when a three-dimensional net is used in place of the planar elastic member, similar effects can be obtained.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

This application is based on application No. 2002-302703 filed Oct. 17, 2002 in Japan, the content of which is herein expressly incorporated by reference in its entirety.

Figure 1:
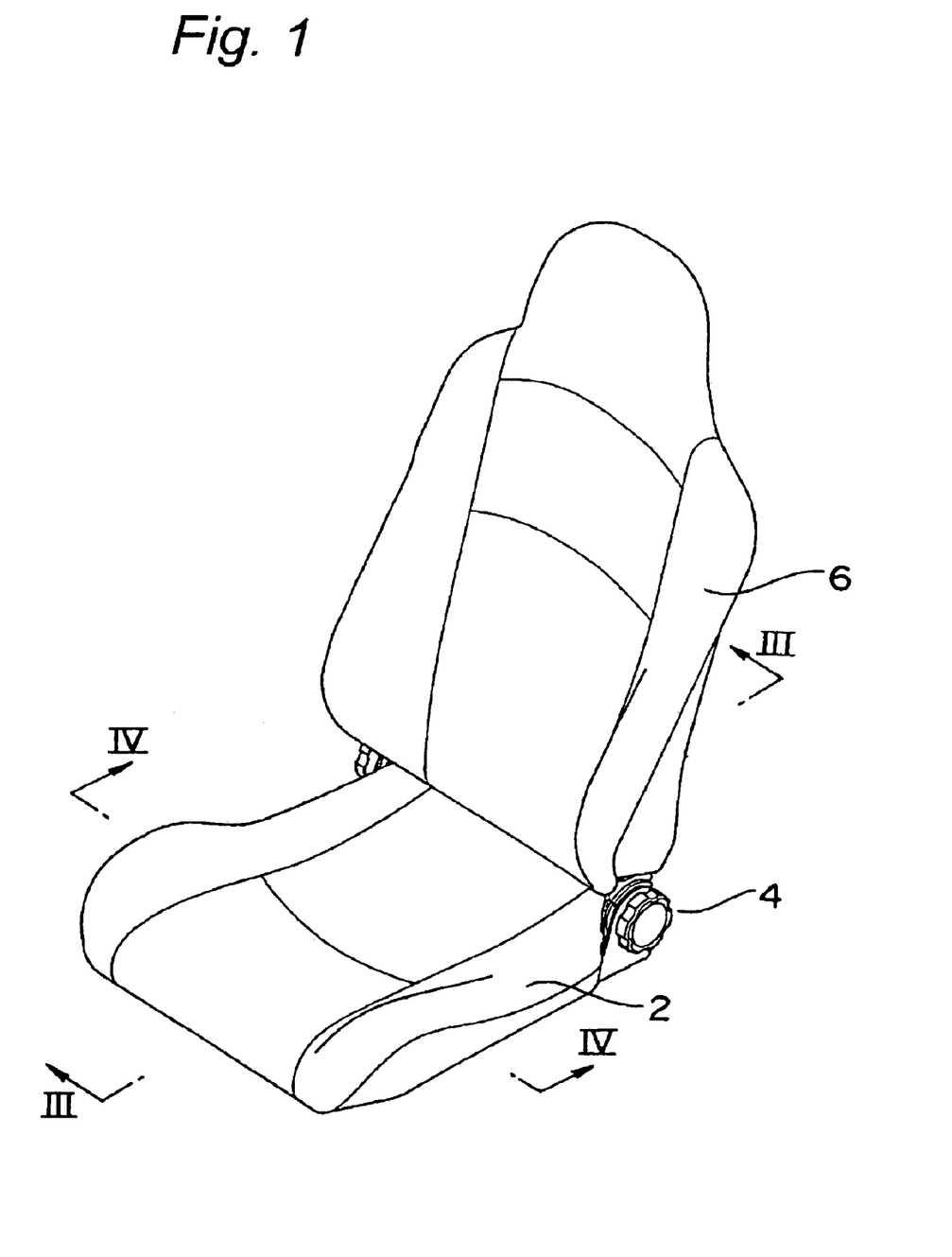
FIG. 1 is a perspective view of a seat according to the present invention.

FIG. 1 depicts a typical example of an automobile seat according to the present invention. The seat shown therein includes a seat cushion 2 and a seat back 6 pivotally mounted on a rear edge of the seat cushion 2 via a hinge mechanism 4.

Figure 2:
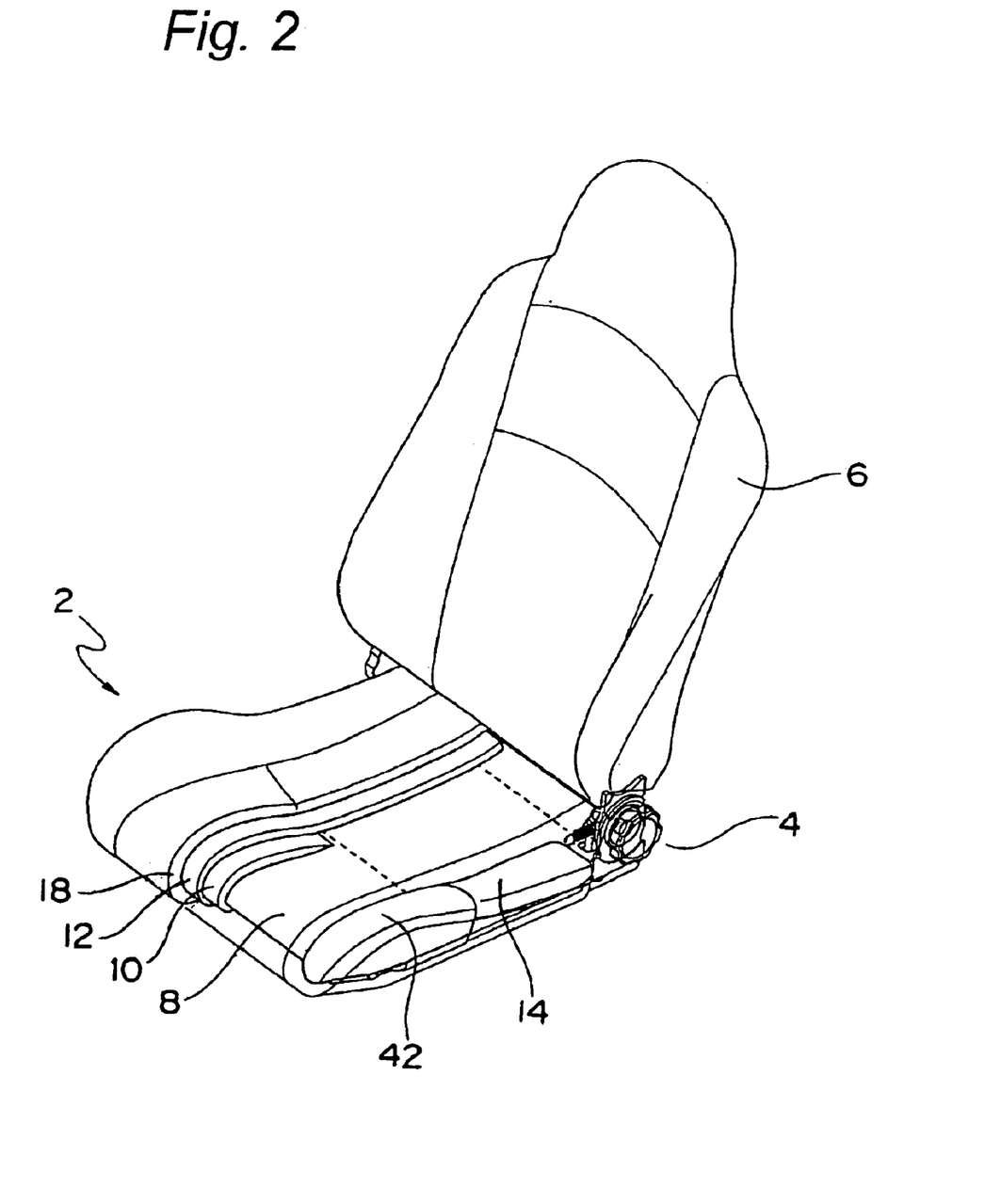
FIG. 2 is a perspective view of the seat of FIG. 1 with a portion of a seat cushion broken away.
Figure 3:
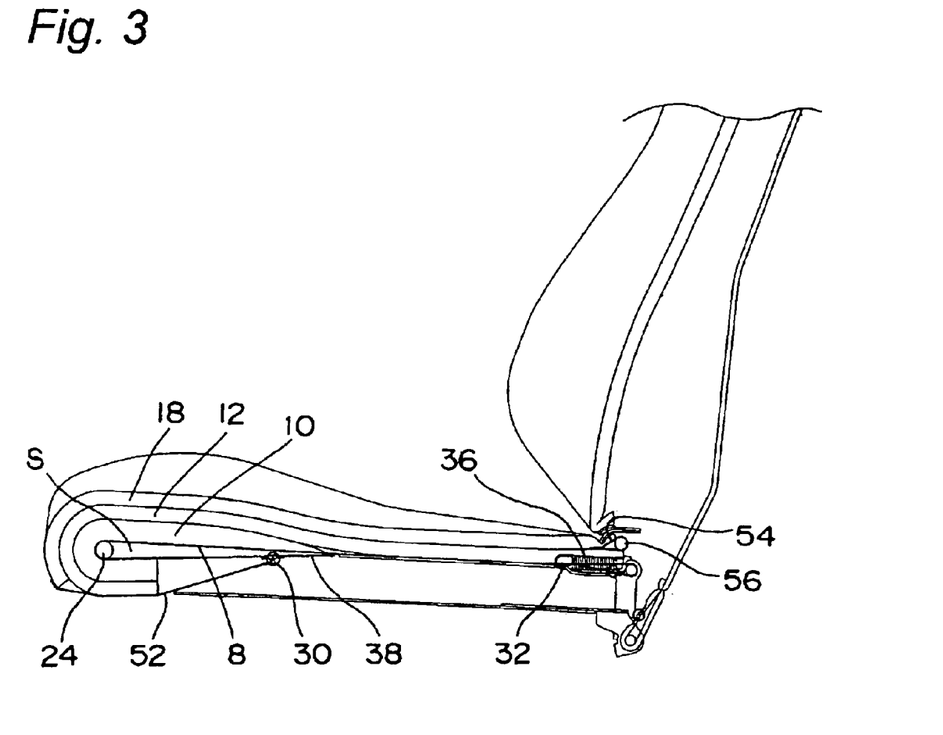
FIG. 3 is a sectional view taken along line III—III in FIG. 1.
Figure 4:
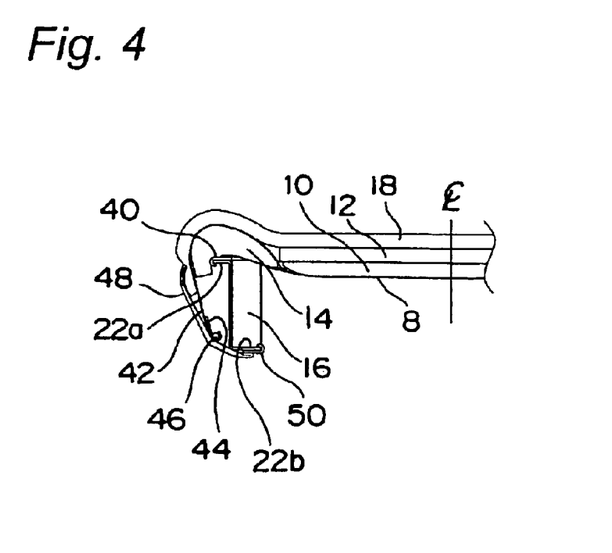
FIG. 4 is a sectional view taken along line IV—IV in FIG. 1.

As shown in FIGS. 2 to 4, the seat cushion 2 includes a planar elastic member (two-dimensional elastic member) 8 stretched over a seat cushion frame 20 (see FIG. 5), a first cushioning material 10 overlaid on a front portion of the planar elastic member 8, a second cushioning material 12 overlaid on the planar elastic member 8 and the first cushioning material 10, third cushioning materials 14 disposed on respective sides of the first and second cushioning materials 10, 12, and fourth cushioning materials 16 each disposed below one of the third cushioning materials 14.

By way of example, urethane is used for the first, third and fourth cushioning materials 10, 14, 16, and a 3-D net (three-dimensional elastic member) is used for the second cushioning material 12.

Figure 5:
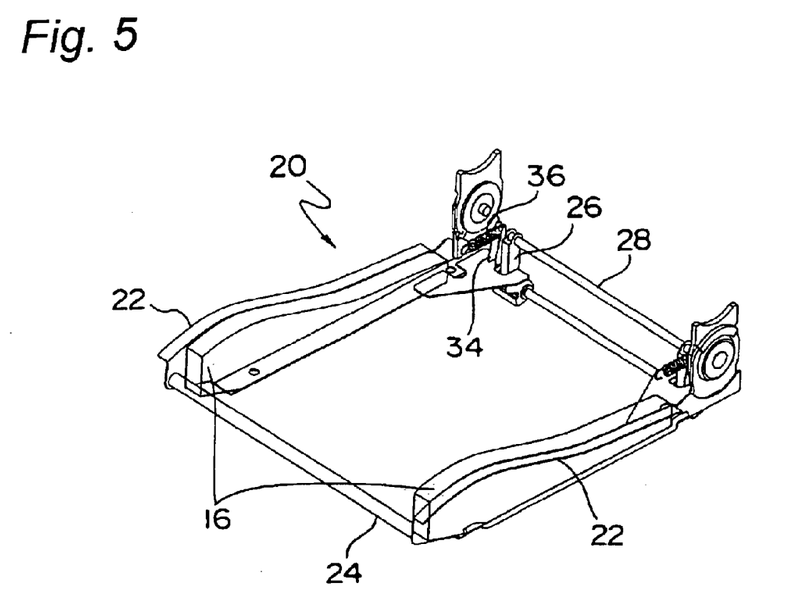
FIG. 5 is a perspective view of a seat cushion frame mounted in the seat of FIG. 1.

More specifically, as shown in FIG. 5, the seat cushion frame 20 includes two side frames 22 disposed on respective sides of the seat structure, a front frame 24 having opposite ends respectively secured to front ends of the two side frames 22, and a rear frame 28 having opposite ends respectively secured to rear ends of the two side frames 22 via an arm 26. Each of the fourth cushioning materials 16 is disposed on the inner side of one of the side frames 22.

Figure 6:
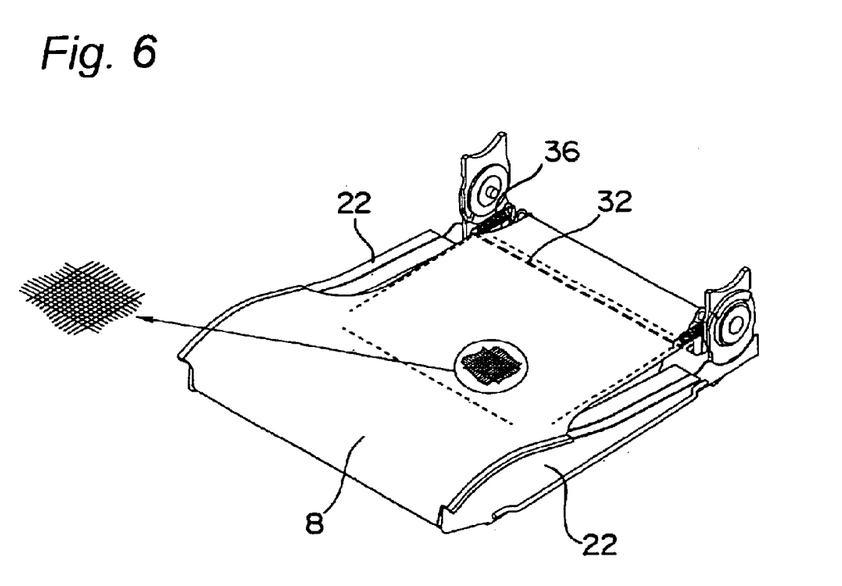
FIG. 6 is a perspective view of the seat cushion frame of FIG. 5, particularly depicting a state in which a planar elastic member has been stretched over it.

As shown in FIGS. 3 and 6, a rear edge portion of the planar elastic member 8 is fixedly connected to the rear frame 28, while a front portion of the planar elastic member 8 is folded back at the front frame 24 with a front edge portion of the planar elastic member 8 fixedly connected to a trim retainer 30 secured to the seat cushion frame 20. A steel wire 32 extending widthwise is sewn to a rear portion of the planar elastic member 8. Two coil springs 36 disposed on respective sides of the seat structure are connected at one end thereof to the steel wire 32 and at the other end thereof to vertically extending brackets 34 respectively secured to the side frames 22. A tension member 38 is sewn at a rear edge thereof to an intermediate portion of the planar elastic member 8 and fixedly connected at a front edge thereof to the trim retainer 30. In this way, a predetermined tension is applied to the planar elastic retainer 30. In this way, a predetermined tension is applied to the planar elastic member 8 in the longitudinal direction thereof.

As shown in FIG. 4, the side frames 22 have respective outwardly bent upper portions 22a, with which opposite sides of the front portion of the planar elastic member 8 are engaged by means of a fitting 40, respectively.

The front portion of the planar elastic member 8 is folded back at the front frame section 24, and the front edge portion of the planar elastic member 8 is fixedly connected to the trim retainer 30. Accordingly, a predetermined space S is created between upper and lower layers of the planar elastic member 8 at a location rearward of the front frame section 24, as shown in FIG. 3. The presence of this space S makes the upper layer of the planar elastic member 8 flex when a user gets in or out of an automobile or operates pedals, thereby eliminating pressure on his or her legs or thighs.

The planar elastic member 8 may be an elastic cloth made up of warps (threads extending longitudinally of the seat cushion 2) and wefts (threads extending widthwise of the seat cushion 2) that have different tensile properties. When the warps, to which a larger tension is applied compared with the wefts, have a larger elongation to load than the wefts, the cushioning characteristics are improved.

Figure 9:
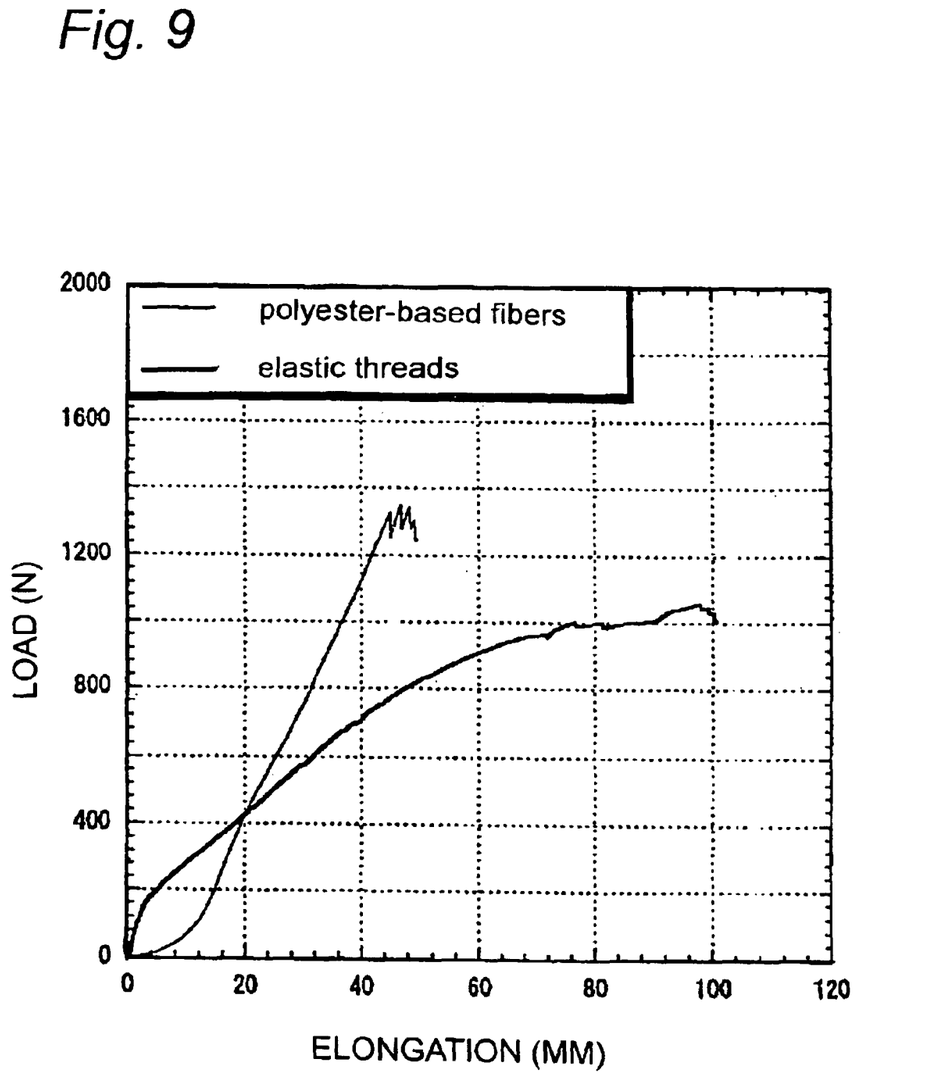
FIG. 9 is a graph indicating the static characteristics of the planar elastic member in the case where elastic threads and polyester-based fibers were employed as warps and wefts, respectively, and an elastic cloth woven of such warps and wefts was used for the planar elastic member.

FIG. 9 depicts the static characteristics of the planar elastic member 8 in the case where elastic threads and polyester-based fibers were employed as the warps and wefts, respectively, and an elastic cloth woven of such warps and wefts was used for the planar elastic member 8. The test speed was set to 50 mm/min.

The graph of FIG. 9 reveals that the warps have a larger elongation to load than the wefts, and that the planar elastic member 8 is apt to elongate in the longitudinal direction thereof. A 3-D net can also be used in place of the planar elastic member 8.

Figure 7:
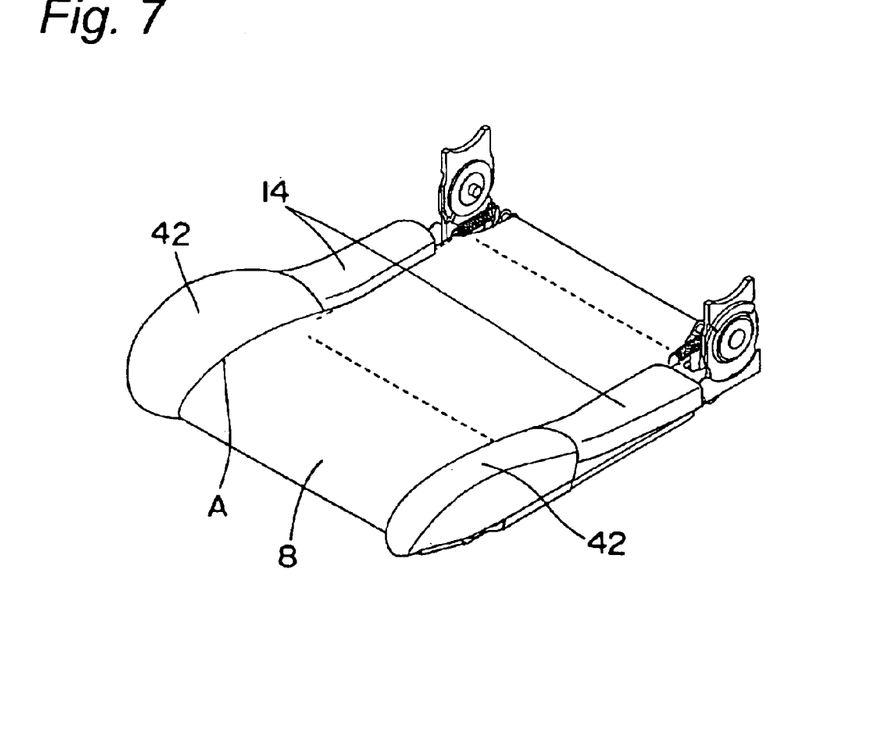
FIG. 7 is a perspective view of the seat cushion frame of FIG. 6, particularly depicting a state in which a cushioning material has been mounted on each side frame.

As described above, the first and second cushioning materials 10, 12 are overlaid on the planar elastic member 8. As shown in FIGS. 4 and 7, covering materials (cloths) 42 are sewn at one side edge thereof to a front portion of the planar elastic member 8 so as to extend substantially parallel to the side edges of the first and second cushioning materials 10, 12. Reference symbol "A" in FIG. 7 indicates the portion where the covering material 42 is sewn to the planar elastic member 8. The third cushioning materials 14 are disposed laterally outwardly of the first and second cushioning materials 10, 12, and are respectively covered with or wrapped in the covering materials 42, the other side edges of which are each fixedly connected via a fitting 44 to a trim retainer 46 secured to the side frame 22, thereby holding each third cushioning material 14 on the fourth cushioning material 16 and the outwardly bent upper portion 22a of the side frame 22.

The resiliency of the seat cushion 2 is enhanced in the widthwise direction thereof by holding the third cushioning material 14 on the fourth cushioning material 16 and the outwardly bent upper portion 22a of the side frame 22 and by covering the third cushioning material 14 with the covering material 42 sewn to the planar elastic member 8. As a result, movement of the user in the direction widthwise of the seat cushion 2 is allowed, enhancing the vibration absorptivity.

Figure 8:
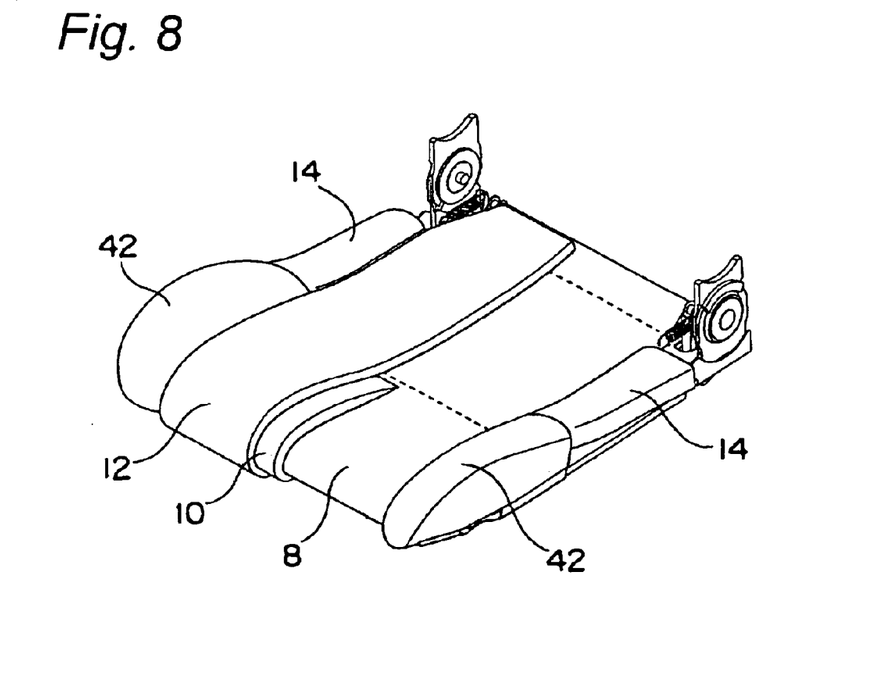
FIG. 8 is a perspective view of the seat cushion of FIG. 7 with a portion thereof broken away, particularly depicting a state in which a cushioning material has been mounted on a front frame and then covered with a 3-D net.

As shown in FIGS. 3 and 8, the front portion of the planar elastic member 8 is covered with the first cushioning material 10, and the planar elastic member 8 and the first cushioning material 10 are covered with the second cushioning material 12. Furthermore, as shown in FIG. 4, these cushioning materials are entirely covered with a skin material 18, opposite side edges of which are each sewn to one end of a tension member 48. The other end of the tension member 48 is engaged with an inwardly bent lower portion 22b of the side frame 22 via a fitting 50, thereby imparting a predetermined tension to the skin material 18 in the direction widthwise thereof. A front edge portion of the skin material 18 is fixedly connected to the trim retainer 30 via a tension member 52, and a rear edge portion of the skin material 18 is fixedly connected to a trim retainer 56 secured to the seat cushion frame 20 via a tension member 54, thereby imparting a predetermined tension to the skin material 18 in the direction longitudinally thereof.

Figure 10A:
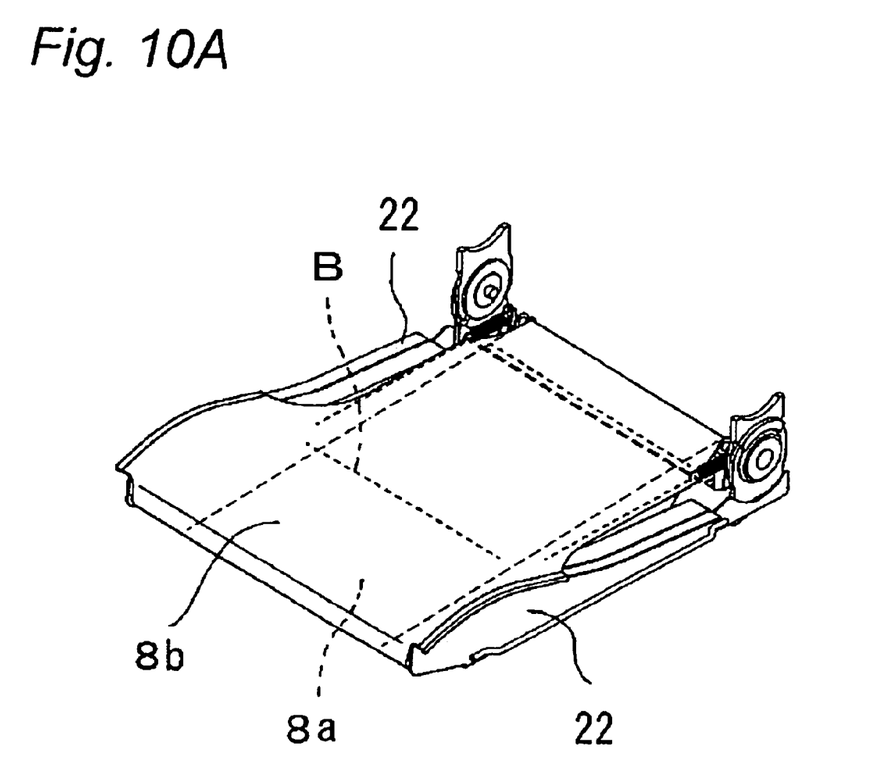
FIG. 10A is a view similar to FIG. 6, but depicting the case where the planar elastic member has a partially double-layered construction.
Figure 10B:
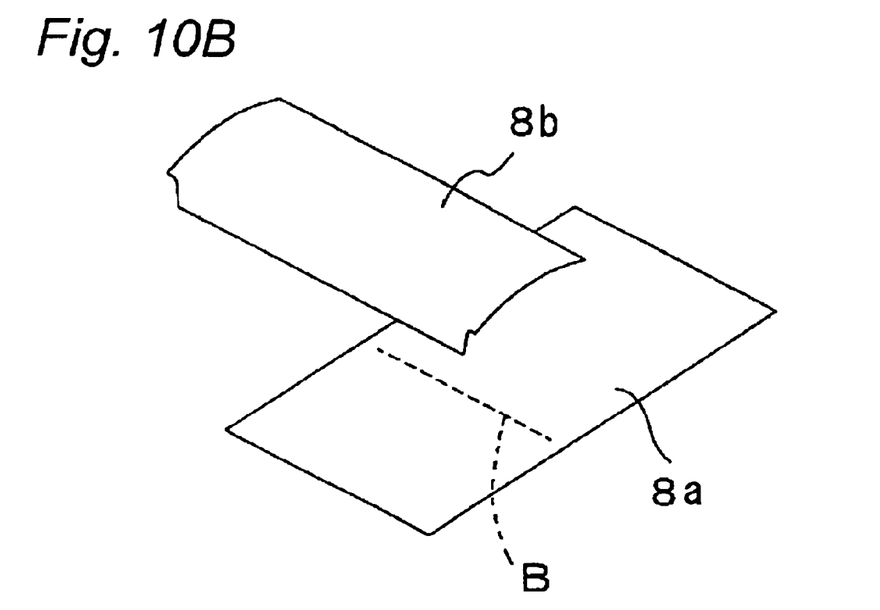
FIG. 10B is an exploded perspective view of only the planar elastic member shown in FIG. 10A.
Figure 11:
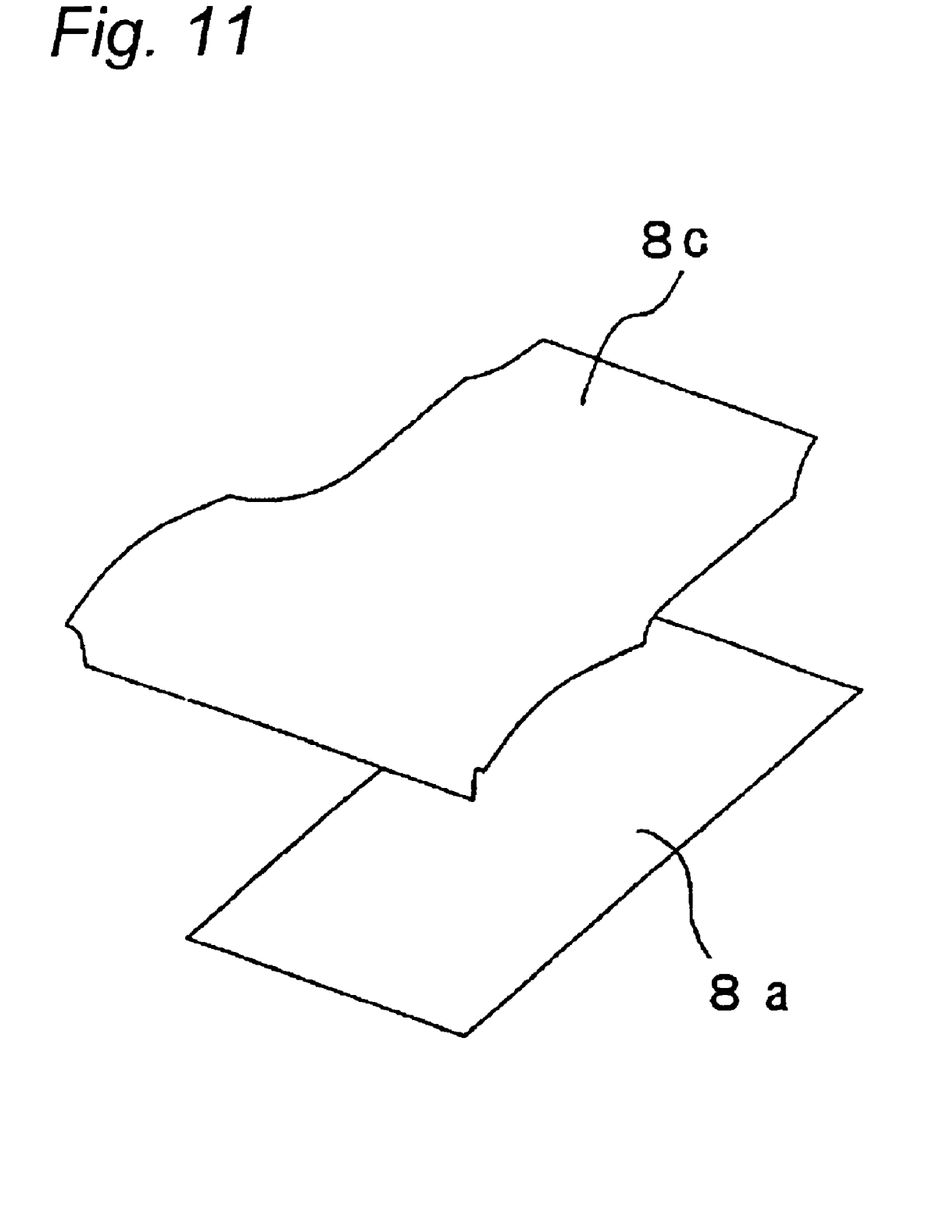
FIG. 11 is an exploded perspective view of the planar elastic member in the case where it has a double-layered construction as a whole.

It is to be noted here that although in the above-described embodiment the planar elastic member 8 is made of a sheet of elastic member, it may be partially or wholly made of two sheets of elastic members, as shown in FIGS. 10A and 10B or in FIG. 11.

More specifically, in the partially double-layered construction shown in FIGS. 10A and 10B, the lower planar elastic member 8a is fixedly connected at a rear edge portion thereof to the rear frame 28 and sewn at a front edge portion thereof to a front edge portion of the upper planar elastic member 8b. Both the front edge portion of the lower planar elastic member 8a and that of the upper planar elastic member 8b are folded back at the front frame 24. A rear edge portion of the upper planar elastic member 8b is sewn to an intermediate portion of the lower planar elastic member 8a. Reference symbol "B" in FIGS. 10A and 10B indicates the portion where the upper planar elastic member 8b is sewn to the lower planar elastic member 8a.

On the other hand, in the wholly double-layered construction shown in FIG. 11, a rear edge portion of the lower planar elastic member 8a and that of the upper planar elastic member 8c are both fixedly connected to the rear frame 28. Front edge portions of the upper and lower planar elastic members 8c, 8a are sewn to each other, and front portions of the upper and lower planar elastic members 8c, 8a are folded back at the front frame 24.

In each of the constructions of FIG. 6, FIGS. 10A and 10B, and FIG. 11, a predetermined space S is created between the upper and lower planar elastic members. The one-sheet construction has a relatively large damping ratio, while the two-sheet construction is large in vibration absorptivity. Accordingly, the construction of the elastic member can be appropriately selected according to the characteristics required for the seat.

In each of the above-described constructions, a 3-D net can be used in place of the planar elastic member.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A seat structure comprising:
   a seat frame having two side frames, a front frame, and a rear frame;
   a planar elastic member stretched between the front frame and the rear frame, the planar elastic member having an upper layer and a lower layer at a location close to the front frame with a predetermined space created between the upper layer and the lower layer;
   a three-dimensional net overlaid on the planar elastic member;
   two covering materials sewn to opposite side edge portions of the planar elastic member, respectively; and
   a cushioning material disposed on each of the two side frames and covered with one of the covering materials.

2. The seat structure according to claim 1, wherein the cushioning material comprises a first cushioning material, further comprising a second cushioning material disposed below the first cushioning material.

3. The seat structure according to claim 1, further comprising a further cushioning material covering the front frame and interposed between the planar elastic member and the three-dimensional net.

4. The seat structure according to claim 1, wherein the planar elastic member comprises an elastic cloth formed of warps and wefts, the warps and the wefts having different tensile properties.

5. A seat structure comprising:
   a seat frame having two side frames, a front frame, and a rear frame;
   a first three-dimensional net stretched between the front frame and the rear frame, the first three-dimensional net having an upper layer and a lower layer at a location close to the front frame with a predetermined space created between the upper layer and the lower layer;
   a second three-dimensional net overlaid on the first three-dimensional net;
   two covering materials sewn to opposite side edge portions of the first three-dimensional net, respectively; and
   a cushioning material disposed on each of the two side frames and covered with one of the covering materials.

6. The seat structure according to claim 5, wherein the cushioning material comprises a first cushioning material, further comprising a second cushioning material disposed below the first cushioning material.

7. The seat structure according to claim 5, further comprising a further cushioning material covering the front frame and interposed between the first three-dimensional net and the second three-dimensional net.

* * * * *